(12) United States Patent
Miyashita et al.

(10) Patent No.: US 7,741,137 B2
(45) Date of Patent: Jun. 22, 2010

(54) METHOD OF MANUFACTURING ELECTRO-OPTICAL DEVICE

(75) Inventors: Shinichi Miyashita, Chitose (JP); Kazushige Watanabe, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/362,216

(22) Filed: Jan. 29, 2009

(65) Prior Publication Data

US 2009/0194572 A1    Aug. 6, 2009

(30) Foreign Application Priority Data

Feb. 1, 2008  (JP) .............. 2008-022422
Dec. 26, 2008  (JP) .............. 2008-332755

(51) Int. Cl.
*H01L 21/00*  (2006.01)

(52) U.S. Cl. .............. 438/33; 438/22; 438/30; 438/462; 257/E21.211; 257/E21.221; 257/E21.584; 257/E21.599

(58) Field of Classification Search .............. 438/22, 438/30, 33, 462; 257/E21.584, E21.211, 257/E21.221, E21.599
See application file for complete search history.

(56) References Cited

U.S. PATENT DOCUMENTS

2005/0202586 A1\* 9/2005 Yamanaka et al. ............ 438/70
2008/0254560 A1\* 10/2008 Yamazaki .................... 438/33

FOREIGN PATENT DOCUMENTS

| JP | 06-048755 | 2/1994 |
| JP | 2006-235010 | 9/2006 |
| JP | 2006-273711 | 10/2006 |
| WO | 03040049 A1 | 5/2003 |

\* cited by examiner

*Primary Examiner*—Long K Tran
(74) *Attorney, Agent, or Firm*—Workman Nydegger

(57) ABSTRACT

A method of manufacturing a plurality of electro-optical devices by notching, dicing, and cutting a composite substrate obtained by adhering a first substrate and a second substrate which faces the first substrate with an electro-optical layer interposed therebetween.

5 Claims, 12 Drawing Sheets

FIG. 5
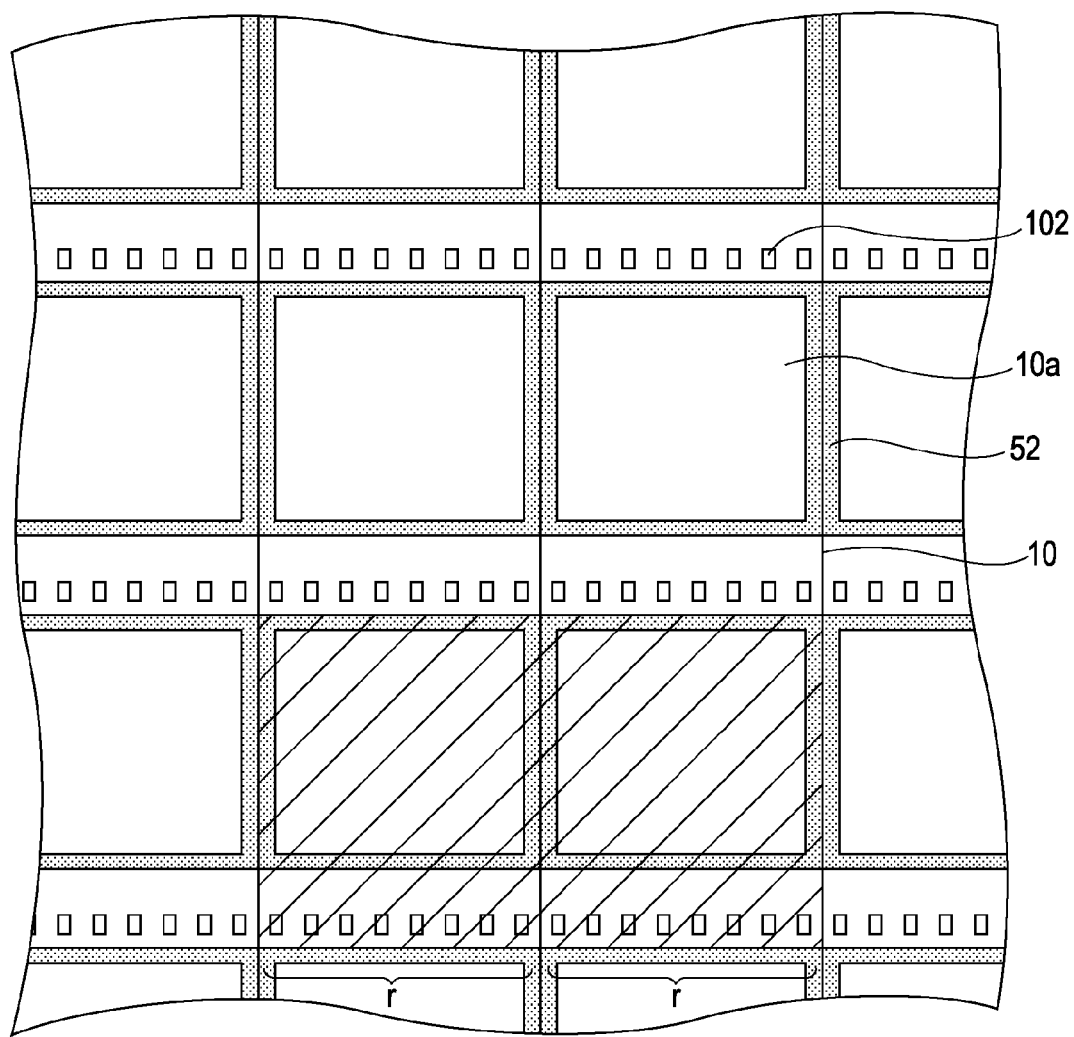

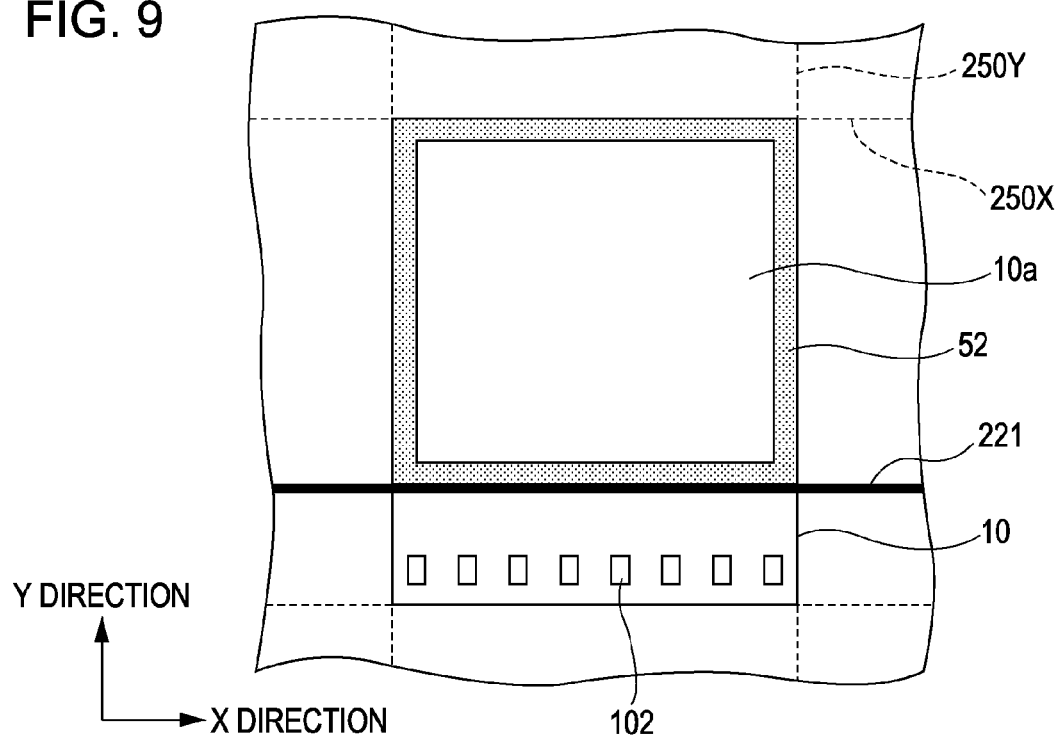
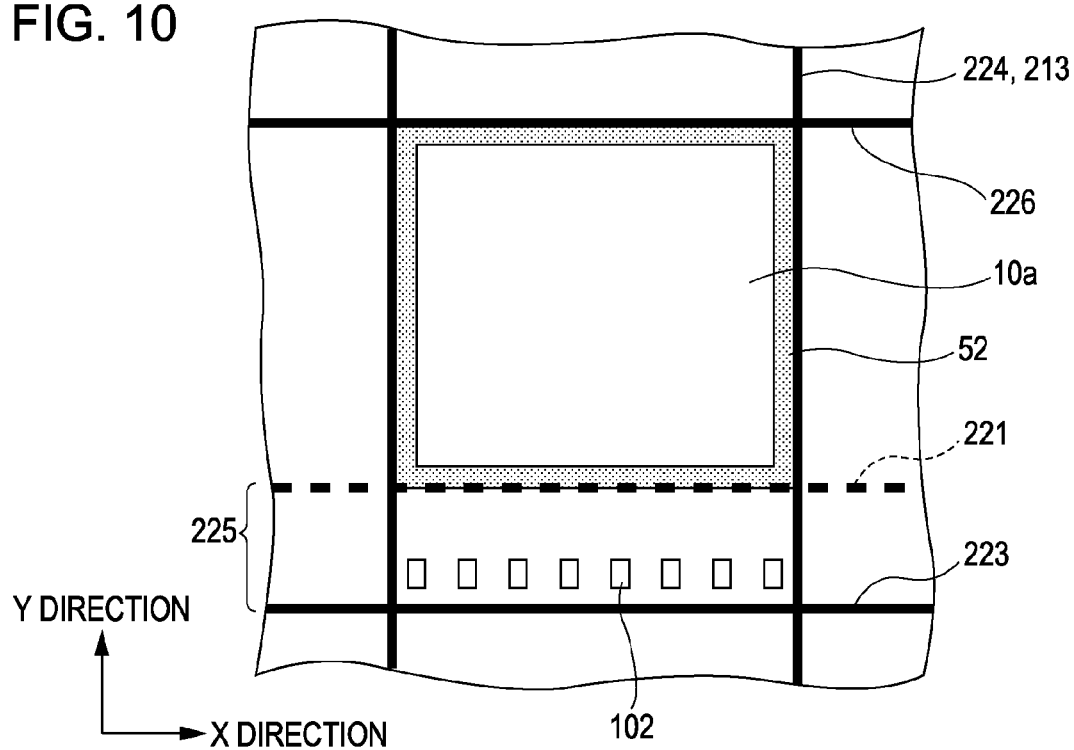

METHOD OF MANUFACTURING ELECTRO-OPTICAL DEVICE

BACKGROUND

1. Technical Field

The present invention relates to a method of manufacturing an electro-optical device which is capable of being applied to a one drop filling (ODF) method used in a method of manufacturing an electro-optical device such as a liquid crystal device, an electro-optical device manufactured by such a manufacturing method, and an electronic apparatus such as liquid crystal projector.

2. Related Art

In this type of a method of manufacturing an electro-optical device, a plurality of liquid crystal devices can be manufactured from one composite substrate by dividing a large composite substrate, on which an electro-optical layer such as liquid crystal is formed between a pair of substrates which are adhered to each other to face each other, into a plurality of liquid crystal devices. When one composite substrate is divided into the plurality of liquid crystal devices, the plurality of liquid crystal devices formed in the composite substrate are divided from each other (for example, see JP-A-6-48755 and JP-A-2006-273711).

In addition, the method of manufacturing the liquid crystal device, the ODF method of dropping liquid crystal on one of the pair of substrates and then adhering the other substrate to one substrate so as to seal the liquid crystal is also used, in addition to a method of adhering the pair of substrates and then injecting the liquid crystal between the substrates.

However, according to the technologies disclosed in JP-A-6-48755 and JP-A-2006-273711, it is difficult to improve external accuracy of the electro-optical device such as the liquid crystal device. In addition, since the divided surface of the substrate is a steep surface, the divided surface is susceptible to be damaged and cracked when the divided electro-optical device such as the liquid crystal device is transported. When the crack occurs, a line as well as the appearance of the electro-optical device may be damaged due to the crack. Accordingly, display performance deteriorates when the electro-optical device displays an image.

SUMMARY

An advantage of some aspects of the invention is that it provides a method of manufacturing an electro-optical device, which is capable of improving external accuracy of an electro-optical device such as a liquid crystal device so as to improve yield and improving display performance of the electro-optical device, an electro-optical device, and an electronic apparatus such as a liquid crystal projector.

According to an aspect of the invention, there is a method of manufacturing a first electro-optical device, which manufactures a plurality of electro-optical devices by cutting a composite substrate obtained by adhering a first substrate and a second substrate which faces the first substrate with an electro-optical layer interposed therebetween, by a plurality of first outer shape lines and a plurality of second outer shape lines which cross each other, the method including: forming first notched portions in a notch surface, which does not face the electro-optical layer, of both surfaces of the second substrate along the first outer shape lines; adhering a first tape to an adhesion surface, which does not face the electro-optical layer, of both surfaces of the first substrate; applying force to the first notched portions from the surface, which is opposed to the adhesion surface, of both surfaces of the first tape so as to form first division surfaces starting from the first notched portions and extending to a first surface, which faces the electro-optical layer, of both surfaces of the second substrate; performing a dicing process with respect to the second substrate from positions different from the first division surfaces along the first outer shape lines so as to form first division grooves extending from the notched surface to the first surface, in the notched surface, and performing the dicing process with respect to the second substrate from the notched surface along the second outer shape lines so as to form second division grooves extending along the second outer shape lines; removing portions surrounded by the first division surfaces, the first division grooves, and the first surface of the second substrate; adhering a second tape to the notched surface after the first tape is removed from the adhesion surface; forming second and third notched portions in the adhesion surface along the first and second outer shape lines; applying force to the second notched portions from the surface, which is opposed to the adhesion surface, of both surfaces of the second tape so as to form second division surfaces starting from the second notched portions and extending to a second surface, which faces the electro-optical layer, of both surfaces of the first substrate and to form third division surfaces starting from the third notched portions and extending along the second outer shape lines; and dividing the plurality of electro-optical devices, which are divided from each other by the applying of the force to the second notched portions, from the second tape.

According to the method of manufacturing the first electro-optical device of the invention, the first substrate and the second substrate formed of a glass substrate and the like are large substrates having a size larger than that of the electro-optical devices which are finally manufactured, and are adhered to each other with a seal portion composed of an adhesive such as a seal material. The electro-optical layer composed of an electro-optical material, such as a liquid crystal layer, is sealed between the first substrate and the second substrate in an area which will become an image display area in each of a plurality of areas on the first substrate surrounded by the plurality of first outer shape lines and the plurality of second outer shape lines which cross each other on the first substrate. The first outer shape lines and the second outer shape lines are virtual lines which are set for convenience of the manufacturing process in order to define the portions which finally become the plurality of electro-optical devices, that is, the areas which will become the electro-optical devices on the first substrate, of the composite substrate including the first substrate, the second substrate, and the electro-optical layer sealed between the substrates, and the portions corresponding to the plurality of areas surrounded by the outer shape lines of the composite substrate finally become the plurality of electro-optical devices.

In the plurality of areas on the first substrate, the area surrounded by the seal material for adhering the first substrate and the second substrate to each other includes the area which becomes the image display area of each of the electro-optical devices which are finally manufactured. The electro-optical layer is sealed so as to configure a portion of each of the plurality of electro-optical devices of the composite substrate in a state of being coated on each of the plurality of areas surrounded by the seal material before the first substrate and the second substrate are adhered to each other.

Accordingly, the method of manufacturing the first electro-optical device according to the invention is applicable to the method of manufacturing the plurality of electro-optical devices from the composite substrate formed by the ODF method which is generally used in the method of manufacturing the electro-optical device such as a liquid crystal device, that is, the composite substrate having the size larger than that of each of the electro-optical devices which are finally manufactured.

In a first process, in the notched surface, which does not face the electro-optical layer, of both surfaces of the second substrate, the first notched portions are formed along the first outer lines. Accordingly, the first notched portions are not discontinuously or partially formed along the first outer shape lines, and are continuously extended along the first outer shape lines, in the notched surface. Each of the first notched portions becomes a chamfered portion of the edge of the substrate portion configuring each of the electro-optical devices when each of the electro-optical devices is completed. Accordingly, it is possible to reduce crack which occurs due to a steep edge surface.

In a second process, the first tape is adhered to the adhesion surface, which does not face the electro-optical layer, of both surfaces of the first substrate. Since the first tape is adhered for the purpose of breaking the composite substrate in the below-described third process, it is preferable that the first tape is adhered to the whole adhesion surface.

In a third process, force is applied from a surface, which is opposed to the adhesion surface, of both surfaces of the first tape to the first notched portions such that first division surfaces starting from the first notched portions and extending to the first surface, which faces the electro-optical layer, of both surfaces of the second substrate are formed. That is, according to the third process, by the first division surfaces extending along the first outer shape lines, the second substrate is scribed so as to be divided from each other along the second outer shape lines.

In a fourth process, in the notched surface, by performing the dicing process with respect to the second substrate from positions deviated from the first division surfaces along the first outer shape lines, the first division grooves extending from the notched surface to the first surface are formed. The first division grooves are formed so as to overlap with the edge along the edge, on which the external circuit connection terminals are formed, of the plurality of edges defining the surface, which faces the electro-optical layer, of both surfaces of the first substrate. Simultaneously or subsequently, in the fourth process, by performing the dicing process with respect to the second substrate from the notched surface along the second outer shape lines, second division grooves extending along the second outer shape lines are formed in the second substrate. That is, the second division grooves extend so as to cross the first division grooves and become start points when the second substrate is divided into a plurality of portions along the direction in which the first outer shape lines extend. The second division grooves may be formed to extend midway the substrate along the thickness direction of the second substrate or to extend to the first surface.

In a fifth process, portions which are surrounded by the first division surfaces, the first division grooves and the first surface of the second substrate are removed. Since the surrounded portions overlap with the external connection terminals in the electro-optical devices which are finally manufactured, the portions are removed in advance by the present process.

In a sixth process, after the first tape is removed from the adhesion surface, the second tape is adhered to the notched surface. Accordingly, the composite substrate is fixed to the second tape at the side of the notched surface. In addition, it is preferable that the second tape is adhered to the whole notched surface and, more particularly, to the whole notched surface after the surrounded portions are removed, similar to the first tape.

In a seventh process, the second and third notched portions are formed in the adhesion surface along the first and second outer shape lines, respectively. Accordingly, the first substrate is ready to be divided into the every portion corresponding to the electro-optical devices along the second outer shape lines.

In an eighth process, force is applied from the surface, which is opposed to the adhesion surface, of both surfaces of the second tape to the second notched portions such that second division surfaces starting from the second notched portions and extending to a second surface, which faces the electro-optical layer, of both surfaces of the first substrate are formed, and third division surfaces starting from the third notched portions and extending along the second outer shape lines are formed. The second notched portions become the start points when the first substrate is scribed. Accordingly, by applying the force from the rear surface, which does not face the adhesion surface, of both surfaces of the second tape to the second notched portions, the second division surface is formed and the first substrate is scribed. Simultaneously or subsequently, the third division surfaces starting from the second division grooves are formed along the second external shape lines. The third division surfaces divide the plurality of electro-optical devices from each other along the first outer shape lines and become the cross sections of the substrate portions configuring the electro-optical devices when the electro-optical devices are completed.

In addition, since the second notched portions also become the chamfered portions similar to the first notched portions, it is possible to reduce the occurrence of crack.

In a ninth process, the plurality of electro-optical devices divided from each other by the eighth process are divided from the second tape. When the plurality of electro-optical devices are removed from the second tape, that is, are separated from the second tape, the plurality of electro-optical devices are sucked by a suction unit such as a sorter device.

According to the method of manufacturing the first electro-optical device according to the invention, since the plurality of electro-optical devices are divided from the composite substrate along the first outer shape lines and the second outer shape lines, it is possible to manufacture the electro-optical devices with high external accuracy. In addition, since the first notched portions and the second notched portions become the chamfered portions in the edges of the substrate portions of the electro-optical devices, for example, it is possible to reduce the generation of crack due to impact applied to the edges of the substrate portions at the time of transporting the electro-optical devices, improve the outer accuracy, and reduce the damage of the lines due to the generation of the occurrence of crack. Accordingly, it is possible to suppress the deterioration of display performance when each of the electro-optical devices displays an image.

In the method of manufacturing the first electro-optical device of the aspect of the invention, after the forming of the first notched portions, the composite substrate may be cleaned using gas.

By this configuration, it is possible to eliminate shavings such as glass and, for example, reduce an electrical contact failure which may occur in the terminal portions when the shavings are attached to the terminal portions.

In the method of manufacturing the first electro-optical device of the aspect of the invention, after the performing of the dicing process, the composite substrate may be dried.

By this configuration, for example, cutting water supplied to the composite substrate at the time of the dicing process is vaporized so as to reduce the residual amount of cutting water which remains in the electro-optical devices which are finally manufactured.

In the method of manufacturing the first electro-optical device of the aspect of the invention, after the applying of the force to the second notched portions, the composite substrate may be cleaned using gas.

By this configuration, it is possible to eliminate shavings such as glass and, for example, reduce an electrical contact failure which may occur in the terminal portions when the shavings are attached to the terminal portions.

According to another aspect of the invention, a first electro-optical device including: a device substrate; a counter substrate which is adhered to the device substrate so as to face the device substrate; an electro-optical layer interposed between the device substrate and the counter substrate in an image display area on the device substrate; and a connection terminal arranged on an end portion of the device substrate, wherein an edge of a surface, which does not face the electro-optical layer, of both surfaces of the counter substrate is chamfered along at least the connection terminal.

According to the first electro-optical device of the invention, compared with the case where the edge surface of the substrate is a steep surface, for example, it is possible to reduce crack which may occur when the electro-optical device is transported and reduce the damage of the appearance of the electro-optical device. In addition, since the occurrence of the crack can be reduced, it is possible to reduce the damage of the lines due to the occurrence of crack and prevent deterioration of display performance when each electro-optical device displays an image.

According to an aspect of the invention, there is an electronic apparatus including the above-described electro-optical device.

Since the electronic apparatus of the invention includes the electro-optical device of the invention, it is possible to achieve a LCOS type projector, a direct-view display device, a display device applied to a cellular phone or a car navigation system, an electronic organizer, a word processor, a small-size information apparatus such as a viewfinder-type or direct-view monitor type video tape recorder, a workstation, a videophone, a POS terminal, or a touch-panel-equipped device, which is capable of achieving a high-quality display.

According to another aspect of the invention, there is provided a method of manufacturing a second electro-optical device, which manufactures a plurality of electro-optical devices by cutting a composite substrate obtained by adhering a first substrate and a second substrate which faces the first substrate with an electro-optical layer interposed therebetween, by a plurality of first outer shape lines and a plurality of second outer shape lines which cross each other, the method including: forming first scribing grooves in an outer surface of the second substrate, which does not face the electro-optical layer, of both surfaces of the second substrate, by performing a scribing process across a predetermined area with respect to the first outer shape lines and along a planned cutting line defined by the first outer shape lines; adhering a first tape to an outer surface of the first substrate, which does not face the electro-optical layer, of both surfaces of the first substrate; pressurizing the second substrate from an outer surface of the first tape, which does not face the first substrate, of both surfaces of the first tape via the first tape and the first substrate so as to perform a breaking process with respect to the second substrate starting from the first scribing grooves; forming dicing grooves by performing a dicing process with respect to the second substrate up to a predetermined depth along the planned cutting line from the outer surface of the second substrate, and cutting the second substrate along the first outer shape lines by penetrating through the second substrate by the dicing process along the first outer shape lines and forming notched portions in an inner surface of the first surface, which faces the electro-optical layer, of both surfaces of the first substrate; cutting the second substrate along the second outer shape lines by performing the dicing process with respect to the second substrate from the outer surface of the second substrate along the second outer shape lines; removing small-piece portions located in the predetermined area sandwiched by the first outer shape lines and the planned cutting line in plan view on the second substrate, from the second substrate; adhering a second tape to the outer surface of the second substrate after the first tape is removed from the outer surface of the first substrate; forming second and third scribing grooves in the outer surface of the first substrate along the first and second outer shape lines by performing a scribing process; pressurizing the first substrate from an outer surface of the second tape, which does not face the second substrate, of both surfaces of the second tape via the second tape and the second substrate so as to form cut surfaces starting from the second scribing grooves and extending to the notched portions and performing the scribing process with respect to the first substrate along the first outer shape lines; pressurizing the first substrate from the outer surface of the second tape via the second tape and the second substrate so as to perform the breaking process with respect to the first substrate along the second outer shape lines starting from the third scribing grooves; and dividing the plurality of electro-optical devices, which are divided from each other, from the second tape.

According to the method of manufacturing the second electro-optical device of the invention, the first substrate and the second substrate formed of a glass substrate and the like are large substrates having a size larger than that of the electro-optical devices which are finally manufactured, and are adhered to each other with a seal portion composed of an adhesive such as a seal material. The electro-optical layer composed of an electro-optical material, such as a liquid crystal layer, is sealed between the first substrate and the second substrate in an area which will become an image display area in each of a plurality of areas on the first substrate surrounded by the plurality of first outer shape lines and the plurality of second outer shape lines which cross each other on the first substrate. The first outer shape lines and the second outer shape lines are virtual lines which are set for convenience of the manufacturing process in order to define the portions which finally become the plurality of electro-optical devices, that is, the areas which will become the electro-optical devices on the first substrate, of the composite substrate including the first substrate, the second substrate, and the electro-optical layer sealed between the substrates, and the portions corresponding to the plurality of areas surrounded by the outer shape lines of the composite substrate finally become the plurality of electro-optical devices.

In the plurality of areas on the first substrate, the area surrounded by the seal material for adhering the first substrate and the second substrate to each other includes the area which becomes the image display area of each of the electro-optical devices which are finally manufactured. The electro-optical layer is sealed so as to configure a portion of each of the plurality of electro-optical devices of the composite substrate in a state of being coated on each of the plurality of areas surrounded by the seal material before the first substrate and the second substrate are adhered to each other.

Accordingly, the method of manufacturing the second electro-optical device according to the invention is applicable to the method of manufacturing the plurality of electro-optical devices from the composite substrate formed by the ODF method which is generally used in the method of manufacturing the electro-optical device such as a liquid crystal device, that is, the composite substrate having the size larger than that of each of the electro-optical devices which are finally manufactured.

In a first process, the first scribing grooves (that is, the scribing lines or the V-shaped cut grooves) are formed in the outer surface of the second substrate, which does not face the electro-optical layer, of both surfaces of the second substrate by performing the scribing process along the planned cutting line. The planned cutting line is a virtual line which is set for convenience of the manufacturing process, similar to the first outer shape lines and the second outer shape lines, and is defined across the predetermined area, in which the connection terminals are formed on the first substrate with respect to the first outer shape lines, and along the first outer shape lines. The scribing process is performed by relatively moving a cutter along the planned cutting line in a state in which, for example, the cutter such as a diamond tip is in contact with the outer surface of the second substrate. The first scribing groove is formed to continuously extend along the planned cutting line.

In a second process, the first tape is adhered to the outer surface of the first substrate, which does not face the electro-optical layer, of both surfaces of the first substrate. Since the first tape is adhered for the purpose of performing the breaking process with respect to the second substrate in the below-described third process, it is preferable that the first tape is adhered to the whole outer surface of the first substrate.

In a third process, the second substrate is pressurized from the outer surface of the first tape, which does not face the first substrate, of both surfaces of the first tape via the first tape and the first substrate such that the breaking process is performed with respect to the second substrate, starting from the first scribing grooves. According to the third process, the second substrate is divided by cracks starting from the first scribing grooves. Since the first scribing grooves are formed along the planned cutting line, the second substrate is broken (that is, divided from each other) along the planned cutting line.

In a fourth process, with respect to the second substrate, from the outer surface of the second substrate, (i) the dicing grooves are formed by performing the dicing process up to the predetermined depth along the planned cutting line (that is, overlapping with the first scribing grooves and the cracks starting from the first scribing grooves) and (ii) the second substrate is cut along the first outer shape lines by penetrating through the second substrate by the dicing process along the first outer shape lines and forming the notched portions (or cut grooves) in the inner surface of the first substrate, which faces the electro-optical layer, of both surfaces of the first substrate. That is, in the fourth process, with respect to the second substrate, from the outer surface of the second substrate, the dicing process is performed along the planned cutting line and the first outer shape lines. However, when the dicing process is performed along the planned cutting line, the dicing process is performed up to the predetermined depth smaller than the thickness of the second substrate such that the second substrate is not completely cut, thereby forming the dicing grooves. In contrast, when the dicing process is performed along the first outer shape lines, the dicing process is performed such that the second substrate is completely cut and the notched portions are formed in the inner surface of the first substrate. The dicing process is performed by pressing a circular rotary cutter (that is, a dicing blade), which is rapidly rotated and is made of, for example, diamond, on the outer surface of the second substrate.

Accordingly, by the fourth process, the cut surfaces along the planned cutting line of the second substrate may be formed to include portions defined by side surfaces of the dicing grooves. That is, in the cut surfaces along the planned cutting line of the second substrate, the second substrate can be cut such that the portions from the outer surface of the second substrate to the predetermined depth are defined by the side surfaces of the dicing grooves. The cut surfaces defined by the side surfaces of the dicing grooves have high smoothness compared with the cut surfaces defined by the cracks starting from the first scribing grooves, for example, and the desired cut surfaces can be formed with high accuracy. In addition, in the fourth process, since the cut surfaces along the first outer shape lines of the second substrate are formed by the dicing process, the cut surfaces along the first outer shape lines of the second substrate can be formed with high accuracy as the desired cut surfaces with high smoothness. Accordingly, the cut surfaces along the first outer shape lines of the second substrate or the portions defined by the side surfaces of the dicing grooves of the cut surfaces along the planned cutting line can be suitably used as a positioning unit when each of the electro-optical devices is, for example, contained in a mounting case. That is, when each of the electro-optical devices is contained in the mounting case, since the cut surfaces along the first outer shape lines of the second substrate or the portions defined by the side surfaces of the dicing grooves of the cut surfaces along the planned cutting line are used as the positioning unit, it is possible to mostly or completely prevent the generation of the positional shift of each electro-optical device in the mounting case or avoid a problem that each electro-optical device cannot be contained in the mounting case.

In addition, in the fourth process, when the dicing process is performed along the planned cutting line, since the dicing process is performed up to the predetermined depth smaller than the thickness of the second substrate such that the second substrate is not completely cut, in a below-described fifth process, by performing the dicing process with respect to the second substrate, when the second substrate is cut along the second outer shape lines, it is possible to suppress or prevent small-piece portions (that is, portions located in the predetermined area of the second substrate) sandwiched by the first outer shape lines of the second substrate and the planned cutting line from being scattered or dispersed.

In addition, by the fourth process, since the notched portions are formed in the inner surface of the first substrate along the first outer shape lines, in the below-described ninth process, it is possible to improve surface accuracy of the cut surfaces when the breaking process is performed with respect to the first substrate along the first outer shape lines.

In a fifth process, by performing the dicing process with respect to the second substrate from the outer surface of the second substrate along the second outer shape lines, the second substrate is cut along the second outer shape lines. Accordingly, the cut surfaces along the second outer shape lines of the second substrate can be formed with high accuracy as the desired cut surfaces with high smoothness.

In a sixth process, in the second substrate, the small-piece portions sandwiched by the first outer shape lines and the planned cutting line on the second substrate in plan view and located in the predetermined area are removed. Since the small-piece portions overlap with the connection terminals (or the external circuit connection terminals) in the electro-optical devices which are finally manufactured, for example, the small-piece portions are removed in advance by the present process.

In a seventh process, after the first tape is removed from the outer surface of the first substrate, the second tape is adhered to the outer surface of the second substrate. Accordingly, the composite substrate is fixed to the second tape at the side of the outer surface of the second substrate. In addition, the second tape is adhered to the whole outer surface of the second substrate and, more particularly, to the whole outer surface of the second substrate after the above-described small-piece portions are removed, similar to the first tape.

In an eighth process, the scribing process performed with respect to the outer surface of the first substrate along the first and second outer shape lines so as to form the second and third scribing grooves. That is, in the eighth process, the scribing process is performed with respect to the outer surface of the first substrate along the first outer shape lines so as to form the second scribing grooves, and the scribing process is performed along the second outer shape lines so as to form the third scribing grooves. Accordingly, the first substrate is ready to be divided into every portion corresponding to the electro-optical devices along the first outer shape lines and the second outer shape lines.

In a ninth process, the first substrate is pressurized from the outer surface of the second tape, which does not face the second substrate, of both surfaces of the second tape via the second tape and the second substrate so as to form cut surfaces starting from the second scribing grooves and extending to the notched portions, and the breaking process is performed with respect to the first substrate along the first outer shape lines. In the ninth process, when the breaking process is performed with respect to the first substrate along the first outer shape lines, as described above, since the notched portions are formed in the inner surface of the first substrate along the first outer shape lines by the fourth process, it is possible to improve the surface accuracy of the cut surfaces when the breaking process is performed with respect to the first substrate along the first outer shape lines.

In a tenth process, by pressuring the first substrate from the outer surface of the second tape via the second tape and the second substrate, the breaking process is performed with respect to the first substrate along the second outer shape lines, starting from the third scribing grooves.

In an eleventh process, the plurality of electro-optical devices divided from each other by the series of the first to tenth processes described above are divided from the second tape. When the plurality of electro-optical devices are removed from the second tape, that is, are separated from the second tape, the plurality of electro-optical devices are sucked by a suction unit such as a sorter device.

According to the method of manufacturing the second electro-optical device of the invention, it is possible to manufacture the electro-optical device with high external accuracy. Thus, it is possible to improve yield.

The operation and other advantages the invention may become apparent from the following detailed description of the invention.

BRIEF DESCRIPTION OF THE DRAWINGS

The invention will be described with reference to the accompanying drawings, wherein like numbers reference like elements.

FIG. 5 is an enlarged plan view of a portion of FIG. 4.

FIG. 9 is a plan view of a process corresponding to a notching process shown in FIG. 6A.

FIG. 10 is a plan view of processes corresponding to FIGS. 7A-7C and FIGS. 8A-8C.

DESCRIPTION OF EXEMPLARY EMBODIMENTS

Hereinafter, an electro-optical device, a method of manufacturing the electro-optical device, and an electronic apparatus according to the embodiments of the invention will be described with reference to the accompanying drawings. In the present embodiment, an active matrix driving type liquid crystal device is used as an example of the electro-optical device according to the invention.

First Embodiment

1: Electro-Optical Device

Figure 1:
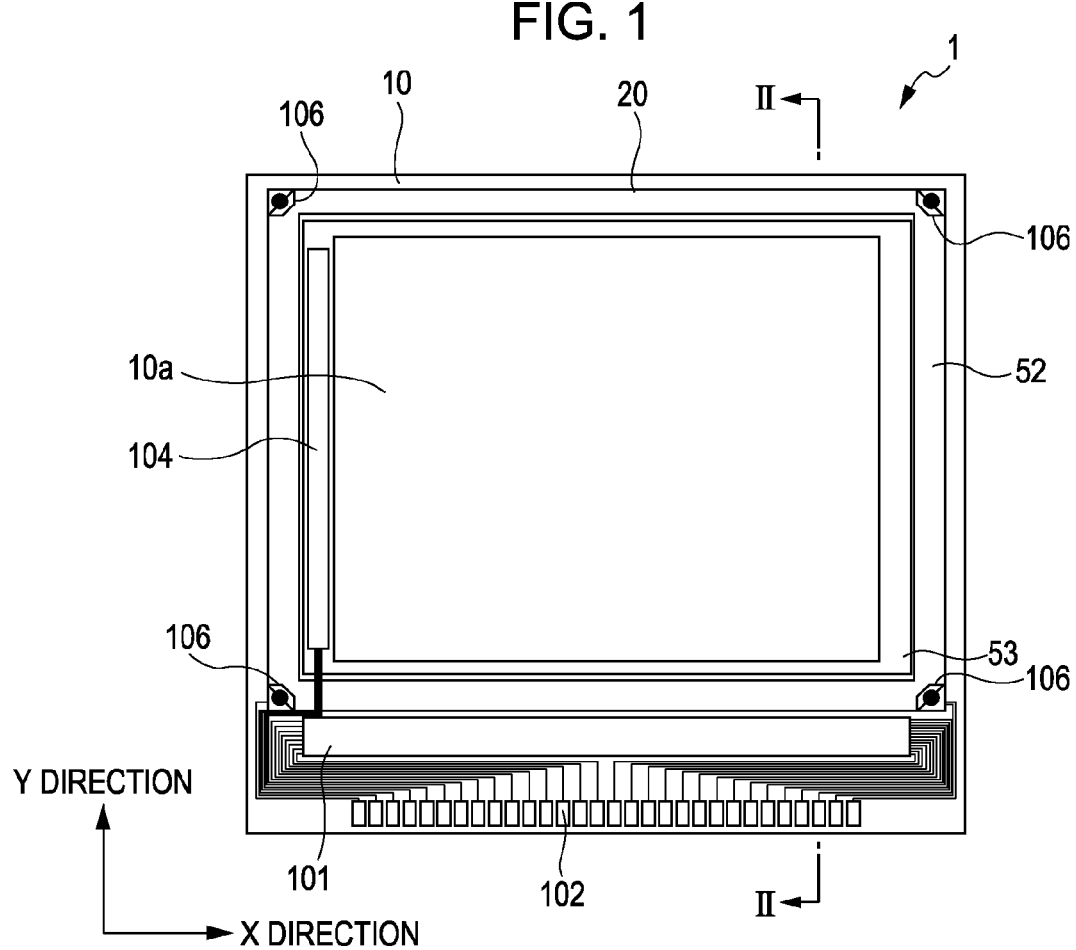
FIG. 1 is a plan view of an electro-optical device according to a first embodiment of the invention.
Figure 2:
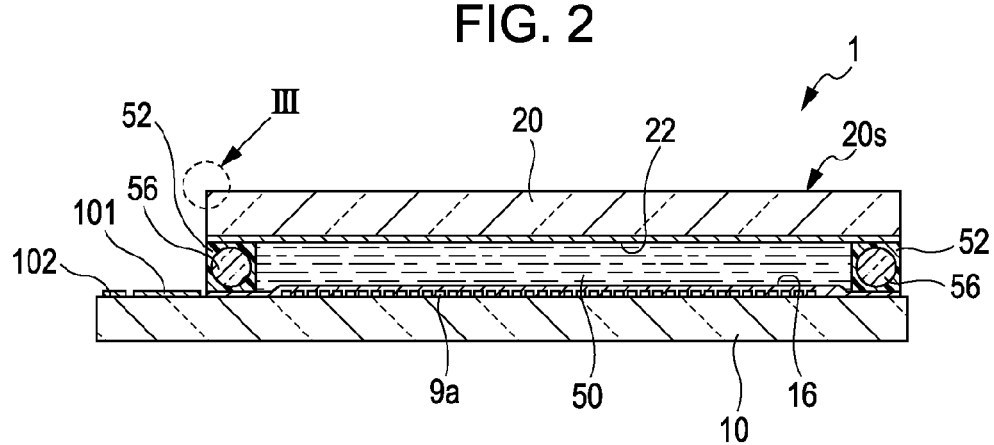
FIG. 2 is a cross-sectional view taken along line II-II of FIG. 1.
Figure 3:
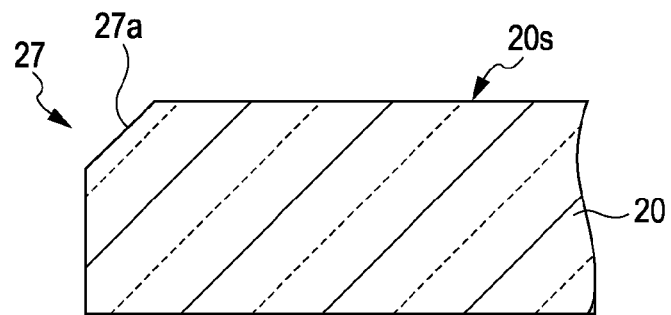
FIG. 3 is a partially enlarged view of a portion of FIG. 2.

The configuration of the liquid crystal device according to the present embodiment will be described with reference to FIGS. 1 and 2. FIG. 1 is a plan view of the liquid crystal device according to the present embodiment when viewed from a counter substrate. FIG. 2 is a cross-sectional view taken along line II-II of FIG. 1. FIG. 3 is a partially enlarged view of a portion of FIG. 2.

In FIGS. 1 and 2, in the liquid crystal device 1, a TFT array substrate 10, which is an example of a "device substrate" of the invention, and the counter substrate 20 face each other. A liquid crystal layer 50 which is an example of an "electro-optical layer" of the invention is filled between the TFT array substrate 10 and the counter substrate 20, and the TFT array substrate 10 and the counter substrate 20 are adhered to each other by a seal material 52 provided in a seal area located at the periphery of an image display area 10a. The liquid crystal layer 50 is configured such that the contrast of an image and the transmissivity of the liquid crystal device 1 are changed according to a driving state.

The seal material 52 is formed of, for example, ultraviolet curing resin, thermosetting resin or the like, for adhering both substrates, is coated on the TFT array substrate 10 in the process of manufacturing the liquid crystal device 1, and is then cured by irradiation of ultraviolet rays, heating or the like. In the seal material 52, gap materials 56 for maintaining a gap between the TFT array substrate 10 and the counter substrate 20 (a gap between substrates) at a predetermined value, such as glass fiber, glass beads or the like, are dispersed.

In parallel to the inside of the seal area in which the seal material 52 is arranged, a frame light-shielding film 53 for defining a frame area of the image display area 10a is provided on the counter substrate 20. A portion or all of the frame light-shielding film 53 may be formed on the counter substrate 20 above electrodes or may be formed on the TFT array substrate 10 as a built-in light-shielding film.

In an area located outside the seal area, in which the seal material 52 is arranged, of a peripheral area located at the periphery of the image display area 10a, a data line driving circuit 101 and a plurality of external circuit connection terminals 102 as a connection terminal are provided on one side of the TFT array substrate 10. A power and various signals for driving the liquid crystal device 1 are supplied to the liquid crystal device 1 via the external circuit connection terminals 102 electrically connected to external circuits. Accordingly, the liquid crystal device 1 becomes an operation state.

Scan line driving circuits 104 are provided along any one of two sides adjacent to the above-described side so as to cover the frame light-shielding film 53. In addition, the scan line driving circuit 104 may be arranged along two sides adjacent to one side of the TFT array substrate 10 on which the data line driving circuit 101 and the external circuit connection terminals 102 are provided. In this case, the scan line driving circuits 104 are connected to each other by a plurality of lines provided along the residual side of the TFT array substrate 10.

At four corner portions of the counter substrate 20, vertical conducting materials 106 which function as vertical conducting terminals between both substrates are arranged. Vertical conducting terminals are provided on the TFT array substrate 10 in areas facing the corner portions. By this configuration, the TFT array substrate 10 and the counter substrate 20 are electrically conducted.

In FIG. 2, on the TFT array substrate 10, an alignment film 16 is formed on pixel electrodes 9a after thin film transistors (hereinafter, referred to as TFTs) functioning as pixel switching elements or lines such as scan lines, data lines and so on are formed. Although the detailed configuration is omitted, in the liquid crystal device 1, the electrodes formed on the counter substrate 20 are arranged so as to face the pixel electrodes 9a, and an alignment 22 is formed thereon. In addition, in the TFT array substrate 10 and the counter substrate 20, various types of substrates such as a glass substrate, a quartz substrate, a plastic substrate, or a silicon substrate are used according to the display type of the liquid crystal device 1 and, more particularly, a transmissive display type or a reflective display type.

Next, the shape of an edge of the TFT array substrate 10 will be described in detail with reference to FIG. 3. FIG. 3 is the enlarged view of a range III of FIG. 2.

In FIG. 3, an edge 27 which is at least one of a plurality of edges for defining a surface 20S of one of both surfaces of the counter substrate 20, which does not face the liquid crystal layer 50, has a chamfered portion 27a. Accordingly, compared with the case where the cross section of the counter substrate 20 is a steep surface, for example, it is possible to reduce crack which may occur when the liquid crystal device 1 is transported and reduce the damage of the appearance of the liquid crystal device 1. In addition, since the occurrence of the crack can be reduced, it is possible to reduce the damage of the lines for electrically connecting the scan line driving circuits 104, the data line driving circuits 101 and the external circuit connection terminals 102 and suppress deterioration of display performance when the liquid crystal device 1 displays an image.

In addition, in the liquid crystal device 1 according to the present embodiment, the chamfered portions may be formed in other edges of the TFT array substrate 10 and the counter substrate 20 as well as in the edge 27. By providing many chamfered portions, it is possible to efficiently reduce occurrence of the crack in the TFT array substrate 10 and the counter substrate 20, improve the external accuracy of the liquid crystal device 1 compared with the case where the chamfered portion is not provided, and improve the display performance.

2: Method of Manufacturing Electro-Optical Device

Figure 4:
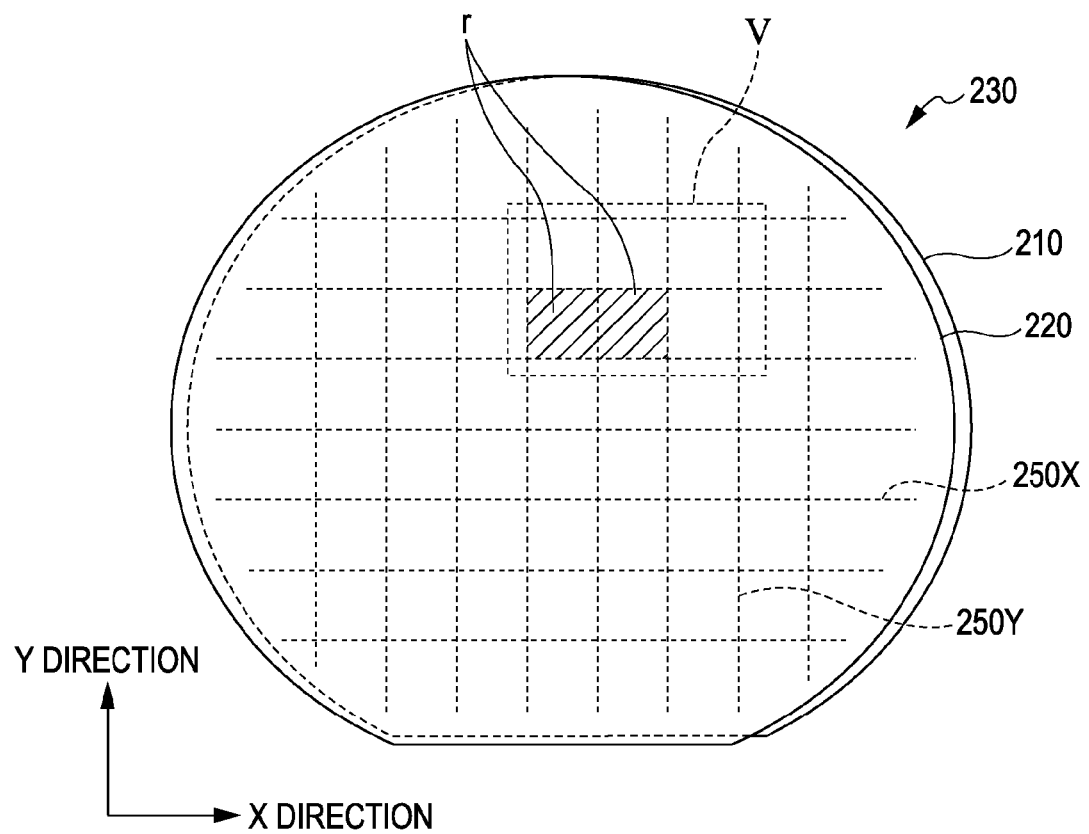
FIG. 4 is a plan view showing a composite substrate used in a method of manufacturing the electro-optical device according to the first embodiment of the invention.
Figure 6A:
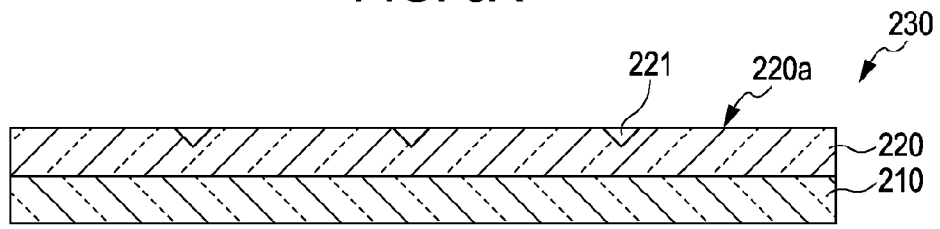
FIGS. 6A-6C are (first) cross-sectional views sequentially showing main processes of the method of manufacturing the electro-optical device according to the first embodiment of the invention.

Next, the method of manufacturing the electro-optical device according to the present embodiment will be described with reference to FIGS. 4 to 10. FIG. 4 is a plan view showing a composite substrate used in the method of manufacturing the electro-optical device according to the present embodiment. FIG. 5 is an enlarged plan view of a portion of FIG. 4. FIGS. 6 to 8 are cross-sectional views sequentially showing main processes of the method of manufacturing the electro-optical device according to the present embodiment. FIG. 9 is a plan view of a process corresponding to a notching process shown in FIG. 6A. FIG. 10 is a plan view of processes corresponding to FIGS. 7 and 8.

In addition, the following method of manufacturing the electro-optical device is the method of manufacturing the above-described liquid crystal device 1. Hereinafter, for convenience of description, the same portions as the above-described liquid crystal device 1 are denoted by the same reference numerals and the detailed description thereof will be omitted. In addition, the seal material 52 and the liquid crystal layer 50 which are the components configuring the liquid crystal device 1 will be omitted.

As shown in FIG. 4, the composite substrate 230 includes a first substrate 210 and a second substrate 220 adhered to the first substrate 210 so as to face the first substrate 210. The first substrate 210 and the second substrate 220 are large substrates each having a size larger than that of each of the liquid crystal devices 1 which are finally manufactured. The first substrate 210 and the second substrate 220 are adhered to each other via the seal portion formed of an adhesive such as the seal material. On the first substrate 210, in an area which will become the image display area 10a in each of a plurality of areas r on the first substrate 210 surrounded by a plurality of first outer shape lines 250x and a plurality of second outer shape lines 250Y which respectively extend in an X direction and a Y direction of the figure and cross each other, the liquid crystal layer 50 (see FIG. 2) is sealed between the first substrate 210 and the second substrate 220. The first outer shape lines 250X and the second outer shape lines 250Y are virtual lines which are set for convenience of the manufacturing process in order to define the portions which finally become the plurality of liquid crystal devices 1, that is, the plurality of areas r which will become the liquid crystal devices 1 on the first substrate 210, of the composite substrate 230 including the first substrate 210, the second substrate 220, and the liquid crystal layer 50 sealed between the substrates.

In the plurality of areas r, the area surrounded by the seal material for adhering the first substrate 210 and the second substrate 220 to each other includes the area which becomes the image display area 10a of each of the liquid crystal devices 1 which are finally manufactured. The liquid crystal layer 50 is sealed so as to configure a portion of each of the plurality of liquid crystal devices 1 of the composite substrate 230 in a state of being coated on each of the plurality of areas r surrounded by the seal material before the first substrate 210 and the second substrate 220 are adhered to each other.

Accordingly, in the method of manufacturing the electro-optical device according to the present embodiment, the plurality of liquid crystal devices 1 is manufactured by the below-described processes, from the composite substrate 230 formed by the ODF method, that is, the composite substrate 230 having the size larger than that of each of the liquid crystal devices 1 which are finally manufactured.

Next, the detailed configuration of the composite substrate 230 of the area V of FIG. 4 will be described with reference to FIG. 5. In addition, in FIG. 5, since the first substrate 210 and the second substrate 220 overlap with each other, these substrates are not shown to be distinguished from each other.

As shown in FIG. 5, in the area V, the external circuit connection terminals 102 are formed in each of the plurality of areas r of the first substrate 210, and the image display area 10a is set in the area surrounded by the seal material 52. In the image display area 10a, an outer edge is defined by a light-shielding portion such as the light-shielding film 53 (see FIG. 1) of each of the liquid crystal devices 1. The portion overlapping with the area r (shown by oblique lines) defined by each of the first outer shapes 250X and each of the second outer shape lines 250Y of the first substrate 210 corresponds to the TFT array substrate 10 of each of the liquid crystal devices 1.

Next, the method of manufacturing the electro-optical device according to the present embodiment will be described in detail with reference to FIGS. 6 to 10.

As shown in FIGS. 6A and 9, in a notched surface 220a, which does not face the liquid crystal layer 50, of both surfaces of the second substrate 220, first notched portions 221 are formed along the first outer shape lines 250X (first process). Accordingly, the first notched portions 221 are not discontinuously or partially formed along the first outer shape lines 250X, and are continuously extended along the first outer shape lines 250X, in the notched surface 220a. In more detail, the first notched portions 221 are formed at positions close to the edge which extends in the X direction at the side close to the external circuit connection terminals 102 along the Y direction, among the plurality of edges of the seal material 52. Each of the first notched portions 221 becomes the chamfered portion 27a when each liquid crystal device 1 is completed. Accordingly, it is possible to reduce crack which occurs due to the steep edge surface of the counter substrate 20.

Figure 6B:
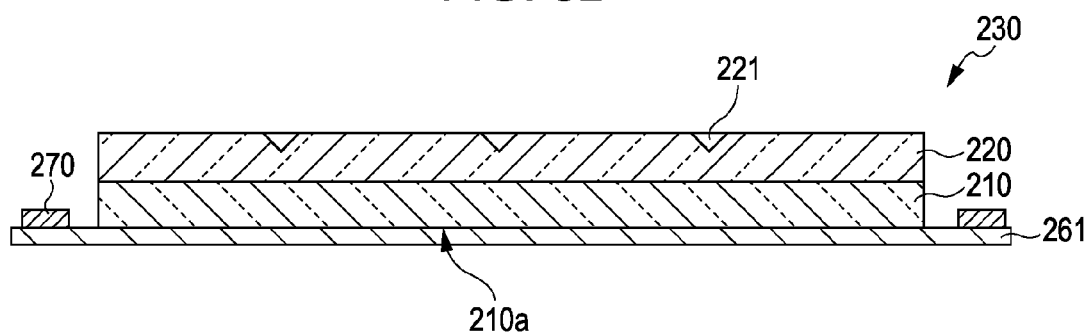

Next, as shown in FIG. 6B, a first tape 261 is adhered to an adhesion surface 210a, which does not face the liquid crystal layer 50, of both surfaces of the first substrate 210 (second process). Since the first tape 261 is adhered for the purpose of breaking the composite substrate 230 in the below-described third process, the first tape is adhered to the whole adhesion surface 210a. In addition, a ring 270 is arranged on the first tape 261 so as to surround the composite substrate 230 in plan view in order to stably perform the third process.

In the present embodiment, between the first process and the second process, the composite substrate 230 is cleaned using gas such as $CO_2$ or dry ice. Accordingly, it is possible to eliminate shaving such as glass which is generated when the first notched portions 221 are formed. Accordingly, it is possible to prevent the shavings generated when the first notched portions 221 are formed from being attached to the external circuit connection terminals 102 in the next process and reduce an electrical contact failure which may occur when the terminal portions are connected to the external circuits.

Figure 6C:
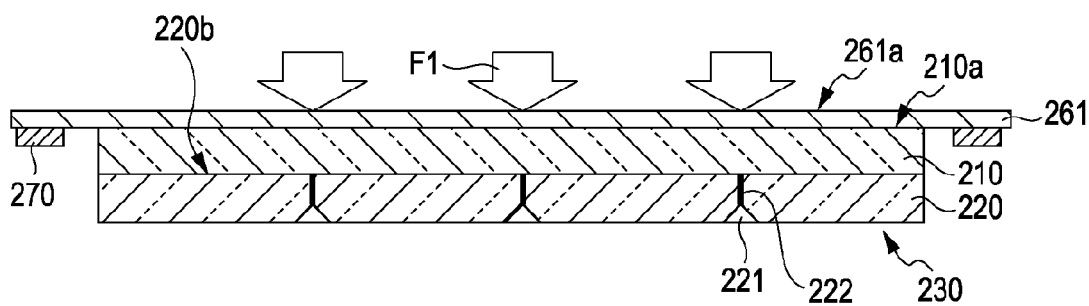

Next, as shown in FIG. 6C, force F1 is applied from a rear surface 261a, which is not in contact with the adhesion surface 210a, of both surfaces of the first tape 261 to the first notched portions 221 such that first division surfaces 222 starting from the first notched portions 221 and extending to a first surface 220b, which faces the liquid crystal layer 50, of both surfaces of the second substrate 220 are formed (third process). That is, according to the third process, by the first division surfaces 222 extending the first outer shape lines 250X, the second substrate 220 is broken so as to be divided from each other along the second outer shape lines 250Y.

Figure 7A:
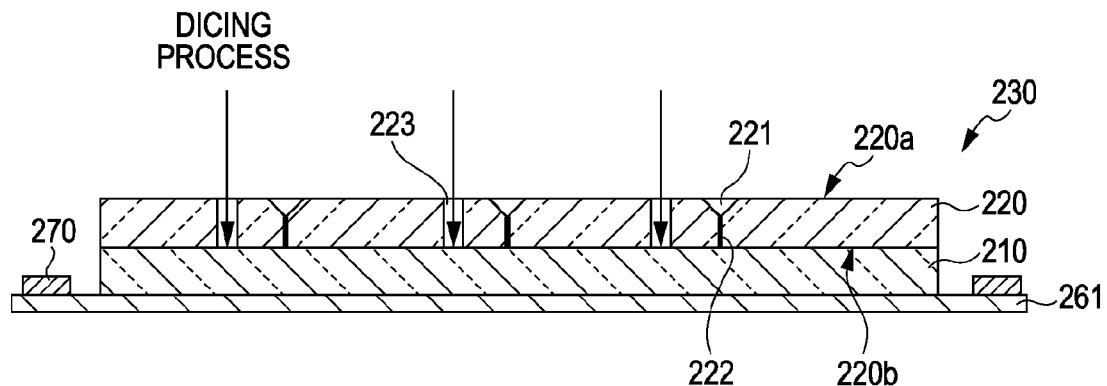
FIGS. 7A-7C are (second) cross-sectional views sequentially showing main processes of the method of manufacturing the electro-optical device according to the first embodiment of the invention.

Next, as shown in FIGS. 7A and 10, in the notched surface 220a, by performing a dicing process with respect to the second substrate 220 from positions deviated from the first division surfaces 222 along the first outer shape lines 250X, first division grooves 223 extending from the notched surface 220a to the first surface 220b are formed (fourth process). The first division grooves 223 are formed so as to overlap with the edge along the edge, on which the external circuit connection terminals 102 are formed, of the plurality of edges defining the surface, which faces the liquid crystal layer 50, of both surfaces of the first substrate 210. Since only the dicing process is performed on the external circuit connection terminals 102, the external circuit connection terminals 102 and the lines electrically connected to the external circuit connection terminals 102 are not damaged. In addition, the external dimension accuracy of the counter substrate 20 is improved by performing a half dicing process along the first notched portions 221. Accordingly, the chamfered portion 27a of the counter substrate 20 is formed.

Simultaneously or subsequently, in the fourth process, by performing the dicing process with respect to the second substrate 220 from the notched surface 220a along the second outer shape lines 250Y, second division grooves 224 extending along the second outer shape lines 250Y are formed in the second substrate 220. That is, the second division grooves 224 extend so as to cross the first division grooves 223 and become start points when the second substrate 220 is divided into a plurality of portions, that is, portions corresponding to the plurality of liquid crystal devices 1, along the direction in which the first outer shape lines 250X extend. The second division grooves 224 may be formed to extend midway the substrate along the thickness direction of the second substrate 220 or to extend to the first surface 220b.

Figure 7B:
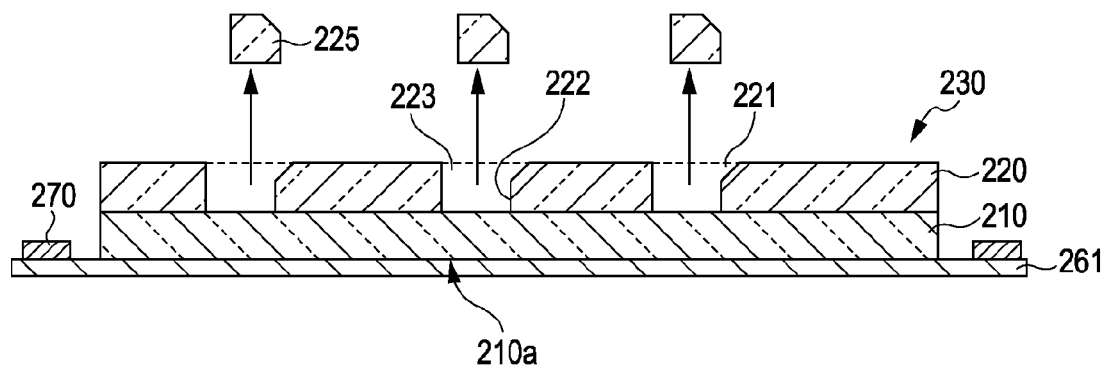

Next, as shown in FIGS. 7B and 10, small-piece portions 225 which are surrounded by the first division surfaces 222, the first division grooves 223 and the first surface 220b of the second substrate 220 are removed (fifth process). Since the small-piece portions 225 overlap with the external circuit connection terminals 102 in the liquid crystal devices 1 which are finally manufactured, the small-piece portions are removed in advance by the present process.

In the present embodiment, between the fourth process and the fifth process, the composite substrate 230 is dried and cutting water supplied to the composite substrate 230 at the time of the dicing process is vaporized, thereby reducing the residual amount of cutting water which remains in the liquid crystal devices 1 which are finally manufactured.

Figure 7C:
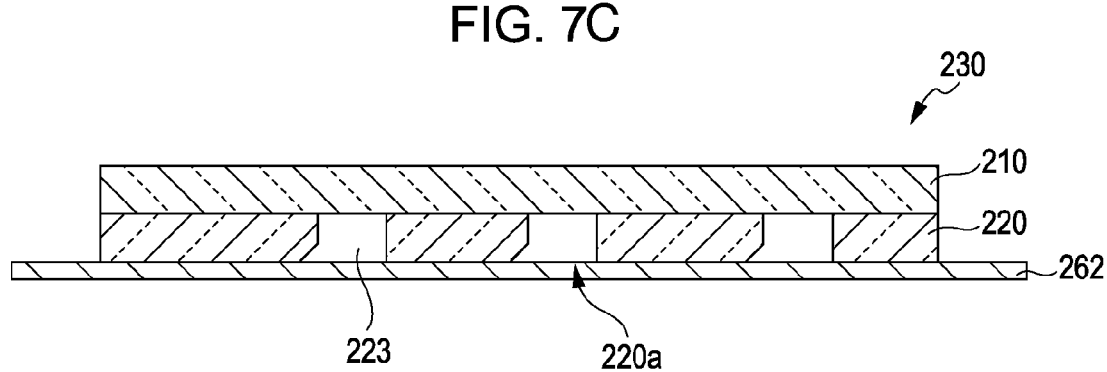

Next, as shown in FIG. 7C, after the first tape 261 is removed from the adhesion surface 210a, a second tape 262 is adhered to the notched surface 220a (sixth process). Accordingly, the composite substrate 230 is fixed to the second tape 262 from the side of the notched surface 220a. In addition, it is preferable that the second tape 262 is adhered to the whole notched surface 220a and, more particularly, to the whole notched surface 220a after the small-piece portions 225 is removed, similar to the first tape 261.

Figure 8A:
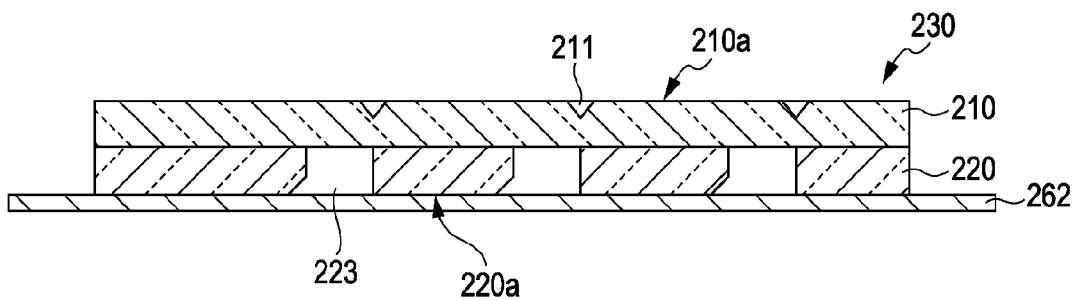
FIGS. 8A-8C are (third) cross-sectional views sequentially showing main processes of the method of manufacturing the electro-optical device according to the first embodiment of the invention.

Next, as shown in FIGS. 8A and 10, second notched portions 211 are formed along the first outer shape lines 250X at positions corresponding to the first division grooves 223 of the adhesion surface 210a (seventh process). Accordingly, the first substrate 210 is ready to be divided into the portions corresponding to the liquid crystal devices 1 along the second outer shape lines 250Y.

Figure 8B:
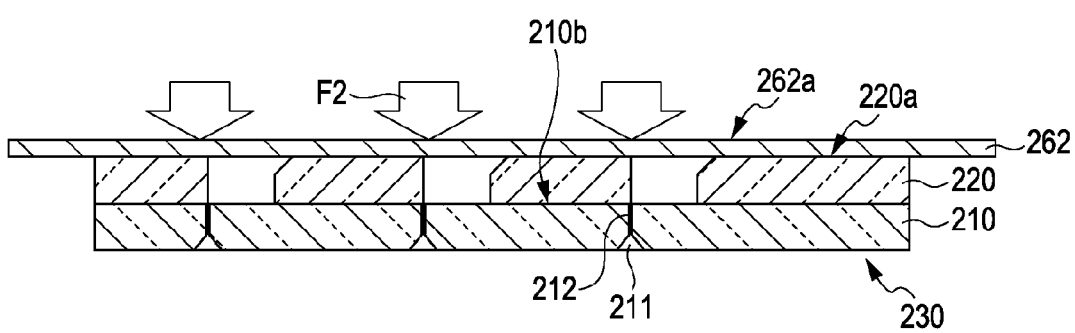
Figure 8C:
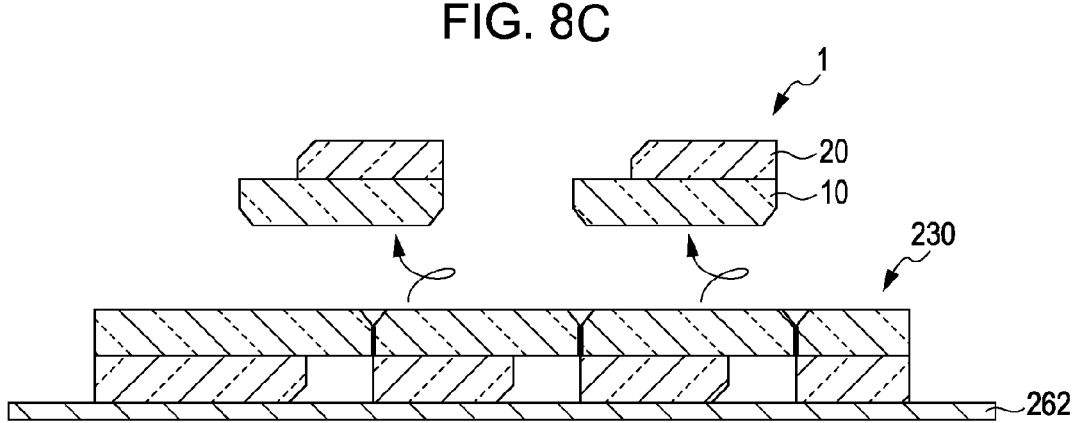

Next, as shown in FIGS. 8B and 10, force F2 is applied from a rear surface 262a, which does not face the adhesion surface 220a, of both surfaces of the second tape 262 to the second notched portions 211 such that second division surfaces 212 starting from the second notched portions 211 and extending to a second surface 210b, which faces the liquid crystal layer 50, of both surfaces of the first substrate 210 are formed, and third division surfaces 213 starting from the second division grooves 224 and extending along the second outer shape lines 250Y are formed (eighth process). The second notched portions 211 become the start points when the first substrate 210 is broken. Accordingly, by applying the force F2 from the side of the rear surface 262a, which does not face the adhesion surface 210a, of both surfaces of the second tape 262 to the second notched portions 211, the first substrate 210 is broken. Simultaneously or subsequently, the third division surfaces 213 starting from the second division grooves 224 are formed along the second external shape lines 250Y. The third division surfaces 213 divide the plurality of liquid crystal devices 1 from each other along the first outer shape lines 250X and become the edge surfaces of the substrate portions configuring the liquid crystal devices 1 when the liquid crystal devices 1 are completed.

In addition, since the second notched portions 211 also become the chamfered portions similar to the first notched portions 221, it is possible to reduce the occurrence of crack.

Next, as shown in 8C, the plurality of liquid crystal devices 1 divided from each other by the eighth process are divided from the second tape 262 (ninth process). When the plurality of liquid crystal devices 1 are removed from the second tape 262, that is, are separated from the second tape 262, the plurality of liquid crystal devices 1 are sucked by a suction unit such as a sorter device.

In addition, according to the method of manufacturing the electro-optical device of the present embodiment, after the eighth process, the composite substrate 230 is cleaned using gas such as $CO_2$ such that shavings generated when the second notched portion 211 is formed can be eliminated. Accordingly, it is possible to reduce an electrical contact failure generated by attaching the shavings to the external circuit connection terminals 102.

As described above, according to the method of manufacturing the electro-optical device according to the present embodiment, since the plurality of liquid crystal devices 1 are divided from the composite substrate 230 along the first outer shape lines 250X and the second outer shape lines 250Y, it is possible to manufacture the liquid crystal devices 1 with high external accuracy. In addition, since the first notched portions 221 and the second notched portions 211 become the chamfered portions in the edges of the substrate portions of the liquid crystal devices 1, for example, it is possible to reduce the generation of crack due to impact applied to the edges of the substrate portions at the time of transporting the liquid crystal devices 1, improve the outer accuracy of the liquid crystal devices 1, and reduce the damage of the lines due to the generation of the crack. Accordingly, it is possible to suppress the deterioration of display performance when each of the liquid crystal devices 1 displays an image.

3: Electronic Apparatus

Figure 11:
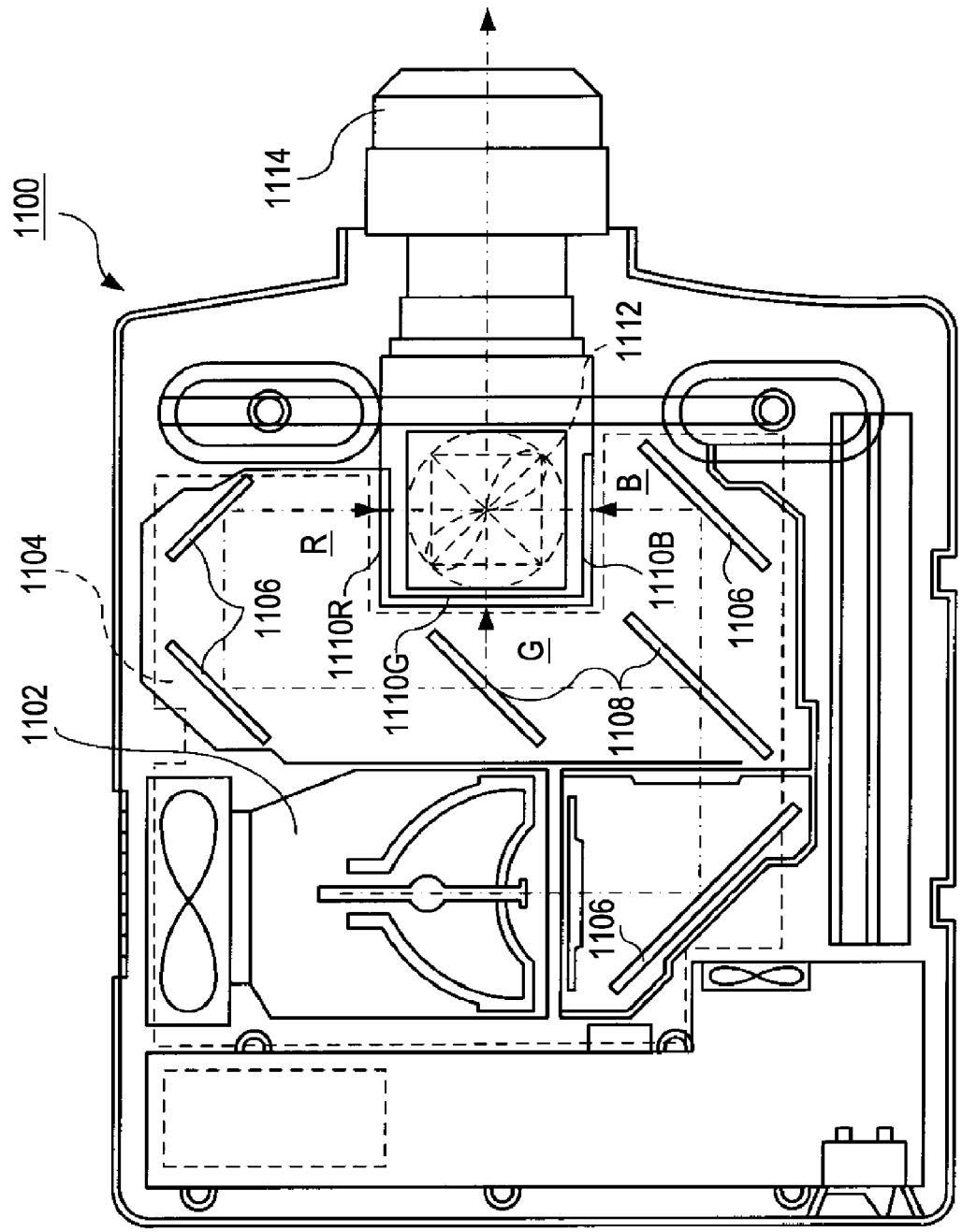
FIG. 11 is a plan view showing an example of an electronic apparatus according to the present embodiment.

Next, an example of an electronic apparatus including the above-described liquid crystal device will be described. The electronic apparatus according to the present embodiment is a projector including an optical system in which retardation films are arranged on a light input side and a light output side of a light valve using the above-described liquid crystal device as the light valve. FIG. 11 is a plan view showing a configuration example of the projector according to the present embodiment.

As shown in FIG. 11, a lamp unit 1102 composed of a white light source such as a halogen lamp or the like is provided inside the projector 1100. An incident light emitted from the lamp unit 1102 is separated into three primary colors of R, G, and B by four mirrors 1106 and two dichroic mirrors 1108 disposed inside a light guide 1104 and the three primary colors are respectively incident to liquid crystal panels 1110R, 1110G, and 1110B as the light valves corresponding to the primary colors.

The liquid crystal panels 1110R, 1110G, and 1110B have the same configuration as the above-described liquid crystal device and are driven by the primary signals of R, G, and B supplied from the image signal processing circuit. The light incident to or emitted from the liquid crystal panels is optically compensated for by the above-described retardation films. The light emitted from the optical system including the liquid crystal panels and the retardation films is made incident into a dichroic prism 1112 from three directions. In the dichroic prism 1112, the light of R and B is refracted at an angle of 90 degrees and the light of G goes straight. Therefore, an image of each color is synthesized, whereby a color image is projected onto a screen or the like through a projector lens 1114.

Here, when attention is focused on a display image by each of the liquid crystal panels 1110R, 1110G, and 1110B, the display image by the light valve 1110G is needed to be mirror-inversed with respect to the display images by the light panels 1110R and 1110B.

Further, since light corresponding to each of the primary colors of R, G, and B is incident to each of the liquid crystal panels 1110R, 1110G, and 1110B by the dichroic mirrors 1108, there is no need to provide a color filter.

In addition, the liquid crystal device according to the present embodiment is not limited to the projection type display device and may configure a portion of a direct-view type liquid crystal display device. In addition, a reflective type liquid crystal device such as LCOS may be configured.

Second Embodiment

A method of manufacturing an electro-optical device according to a second embodiment of the invention will be described with reference to FIGS. 12 to 15. In addition, the method of manufacturing the electro-optical device according to the second embodiment is an example of the method of manufacturing the second electro-optical device according to the invention. In addition, in FIGS. 12 to 15, the same components as the first embodiment shown in FIGS. 1 to 10 are denoted by the same reference numerals and the description thereof will be properly omitted.

FIGS. 12 to 14 are cross-sectional views sequentially showing main processes of the method of manufacturing the electro-optical device according to the second embodiment. FIG. 15 is an enlarged plan view of a portion of a composite substrate used in the method of manufacturing an electro-optical device according to a second embodiment.

In FIG. 15, in the method of manufacturing the electro-optical device according to the second embodiment, the composite substrate 230 formed by the ODF method is cut along the plurality of first outer shape lines 250X, the plurality of second outer shapes lines 250Y and a planned cutting line 900 according to the process described below so as to manufacture the plurality of liquid crystal devices 1.

Figure 12A:
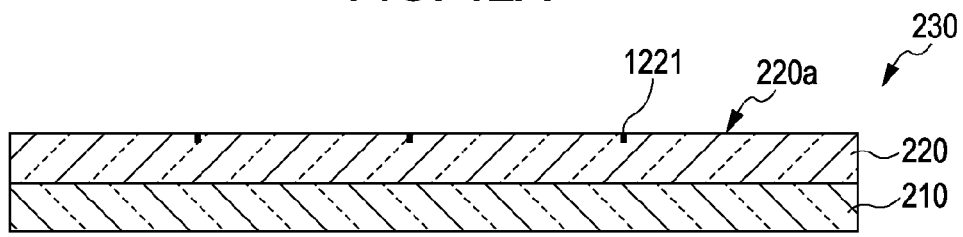
FIG. 12 is a (first) cross-sectional view sequentially showing main processes of the method of manufacturing the electro-optical device according to a second embodiment of the invention.

As shown in FIGS. 12A and 15, first, scribing grooves 1221 are formed in the notched surface 220a, which does not face the liquid crystal layer 50, of both surfaces of the second substrate 220 by performing a scribing process along the planned cutting line 900 (first process). The scribing grooves 1221 are formed to continuously extend along the planned cutting line 900. In addition, the notched surface 220a is an example of the "outer surface of the second substrate" in the method of manufacturing the second electro-optical device according to the invention.

As shown in FIG. 15, the planned cutting line 900 is a virtual line which is set for convenience of the manufacturing process, similar to the first outer shape lines 250X and the second outer shape lines 250Y. The planned cutting line 900 is defined across an area 102a, in which the external circuit connection terminals 102 are formed on the first substrate 210 with respect to the first outer shape lines 250X, and along the first outer shape lines 250X. The scribing process is performed by relatively moving a cutter along the planned cutting line 900 in a state in which, for example, the cutter such as a diamond tip is in contact with the notched surface 220a.

Figure 12B:
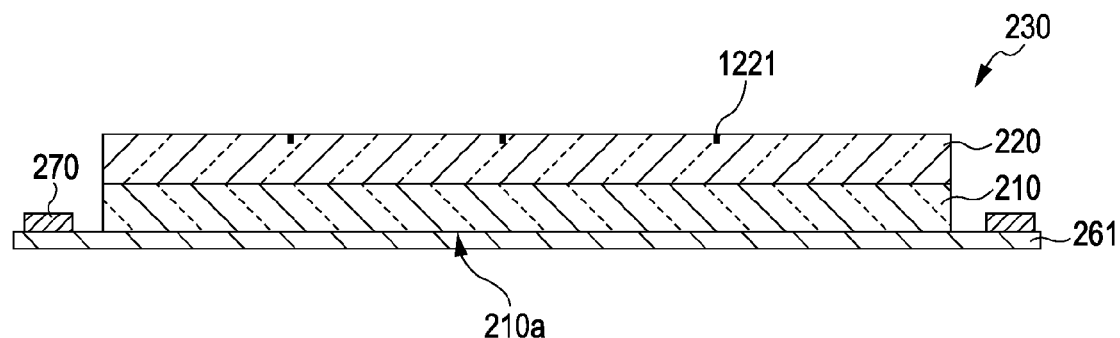

Next, as shown in FIG. 12B, the first tape 261 is adhered to the adhesion surface 210a, which does not face the liquid crystal layer 50, of both surfaces of the first substrate 210 (second process). In addition, the adhesion surface 210a is an example of the "outer surface of the first substrate" in the method of manufacturing the second electro-optical device according to the invention. Since the first tape 261 is adhered for the purpose of performing the breaking process with respect to the second substrate 220 in the below-described third process, the first tape is adhered to the adhesion surface 210a. In addition, the ring 270 is arranged on the first tape 261 so as to surround the composite substrate 230 in plan view in order to stably perform the below-described third process.

Figure 12C:
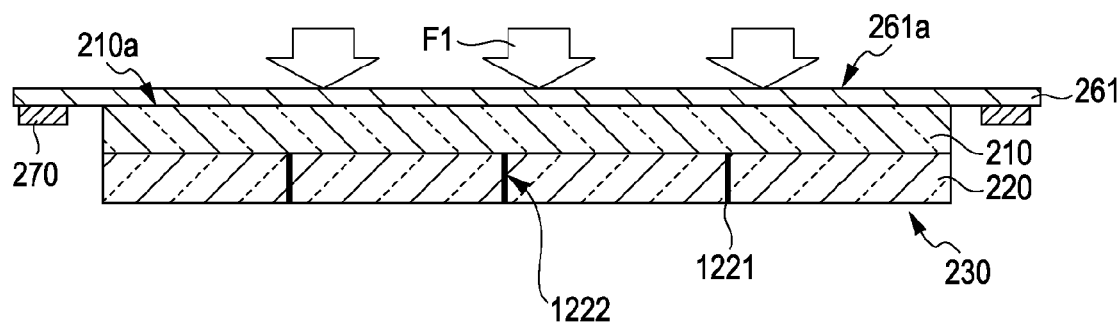

Next, as shown in FIGS. 12C and 15, the second substrate 220 is pressurized from the rear surface 261a, which does not face the first substrate 210, of both surfaces of the first tape 261 via the first tape 261 and the first substrate 210 (that is, force F1 is applied to the second substrate 220), such that the breaking process is performed with respect to the second substrate 210, starting from the scribing grooves 1221 (third process). The rear surface 261a is an example of the "outer surface of the first tape" in the method of manufacturing the second electro-optical device according to the invention. According to the third process, the second substrate 220 is divided by cracks 1222 starting from the scribing grooves 1221. Since the scribing grooves 1221 are formed along the planned cutting line 900, the second substrate 220 is broken along the planned cutting line 900.

Figure 13A:
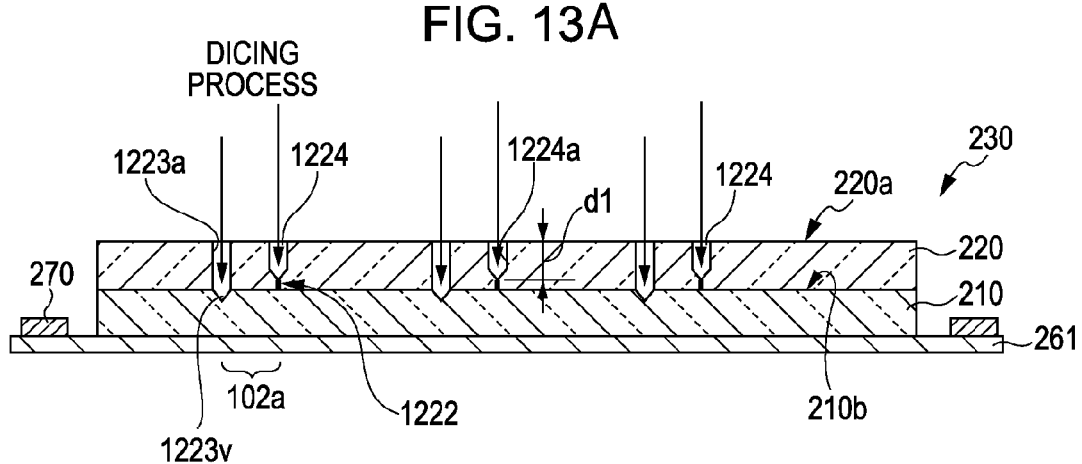
FIGS. 13A-13C are (second) cross-sectional views sequentially showing main processes of the method of manufacturing the electro-optical device according to the second embodiment of the invention.

Next, as shown in FIGS. 13A and 15, with respect to the second substrate 220, from the notched surface 220a, (i) dicing grooves 1224 are formed by performing a dicing process up to a predetermined depth d1 along the planned cutting line 900 (that is, overlapping with the scribing grooves 1221 and the cracks 1222) and (ii) the second substrate 220 is cut along the first outer shape lines 250X by penetrating through the second substrate 220 by the dicing process along the first outer shape lines 250X and forming notched portions (or cut grooves) 1223V in the first surface 210b, which faces the liquid crystal layer 50, of both surfaces of the first substrate 210 (fourth process). In addition, the first surface 210b is an example of the "inner surface of the first substrate" in the method of manufacturing the second electro-optical device according to the invention.

That is, in the fourth process, with respect to the second substrate 220, from the notched surface 220a, the dicing process is performed along the planned cutting line 900 and the first outer shape lines 250X. However, when the dicing process is performed along the planned cutting line 900, the dicing process is performed up to the predetermined depth d1 smaller than the thickness of the second substrate 220 such that the second substrate 220 is not completely cut, thereby forming the dicing grooves 1224. In contrast, when the dicing process is performed along the first outer shape lines 250X, the dicing process is performed such that the second substrate 220 is completely cut and the notched portions 1223V are formed in the first surface 210b. The dicing process is performed by pressing a circular rotary cutter (that is, a dicing blade), which is rapidly rotated and is made of, for example, diamond, from the notched surface 220a.

Accordingly, by the fourth process, the cut surfaces along the planned cutting line 900 of the second substrate 220 may be formed to include portions defined by side surfaces 1224a of the dicing grooves 1224. That is, in the cut surfaces along the planned cutting line 900 of the second substrate 220, the second substrate 220 can be cut such that the portions from the notched surface 220a to the predetermined depth d1 are defined by the side surfaces 1224a of the dicing grooves 1224. The cut surfaces defined by the side surfaces 1224a of the dicing grooves 1224 have high smoothness compared with, for example, the cut surfaces defined by the cracks 1222 starting from the scribing grooves 1221, and the desired cut surfaces can be formed with high accuracy. In addition, in the fourth process, since the cut surfaces along the first outer shape lines 250X of the second substrate 220 are formed by the dicing process, the cut surfaces along the first outer shape lines 250X of the second substrate 220 can be formed with high accuracy as the desired cut surfaces with high smoothness. Accordingly, the cut surfaces along the first outer shape lines 250X of the second substrate 220 or the portions defined by the side surfaces 1224a of the dicing grooves 1224 of the cut surfaces along the planned cutting line 900 can be suitably used as a positioning unit when each of the liquid crystal devices 1 is, for example, contained in a mounting case. That is, when each of the liquid crystal devices 1 is contained in the mounting case, since the cut surfaces along the first outer shape lines 250X of the second substrate 220 or the portions defined by the side surfaces 1224a of the dicing grooves 1224 of the cut surfaces along the planned cutting line 900 are used as the positioning unit, it is possible to mostly or completely prevent the generation of the positional shift of each liquid crystal device 1 in the mounting case or avoid a problem that each liquid crystal device 1 cannot be contained in the mounting case.

In addition, in the fourth process, when the dicing process is performed along the planned cutting line 900, since the dicing process is performed up to the predetermined depth d1 smaller than the thickness of the second substrate 220 such that the second substrate 220 is not completely cut, in a below-described fifth process, by performing the dicing process with respect to the second substrate 220, when the second substrate 220 is cut along the second outer shape lines 250Y, it is possible to prevent small-piece portions 1225 (that is, portions located in the area 102a of the second substrate 220) sandwiched by the first outer shape lines 250X and the planned cutting line 900 in the second substrate 220 from being scattered or dispersed.

In addition, by the fourth process, since the notched portions 1223v are formed in the first surface 210b of the first substrate 210 along the first outer shape lines 250X, in the below-described ninth process, it is possible to improve surface accuracy of the cut surfaces when the breaking process is performed with respect to the first substrate 210 along the first outer shape lines 250X. In addition, the edge of the surface of the TFT array substrate 10 opposed to the counter substrate 20 after the below-described eleventh process simultaneously becomes the chamfered portions by the notched portions 1223v. Accordingly, the external accuracy of each liquid crystal device 1 is improved.

Next, by performing the dicing process with respect to the second substrate 220 from the notched surfaces 220a along the second outer shape lines 250Y, the second substrate 220 is cut along the second outer shape lines 250Y (fifth process). Accordingly, the cut surfaces along the second outer shape lines 250Y of the second substrate 220 can be formed with high accuracy as the desired cut surfaces with high smoothness.

Figure 13B:
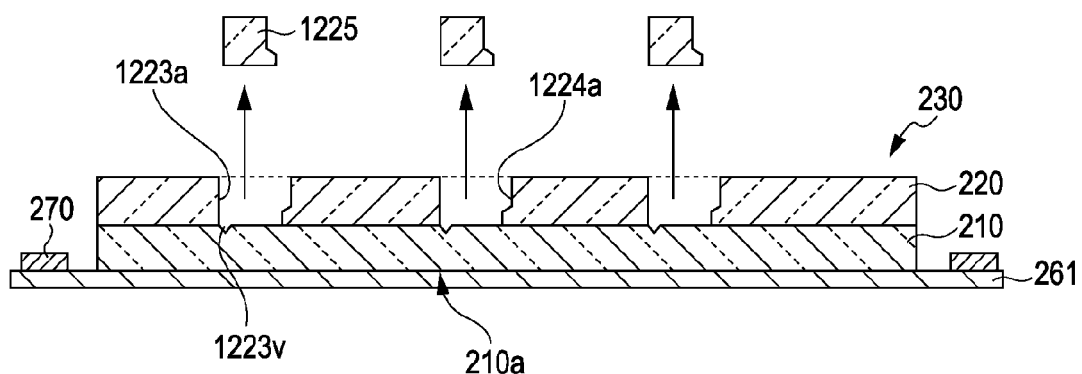

Next, as shown in FIGS. 13B and 15, in the second substrate 220, the small-piece portions 1225 sandwiched by the first outer shape lines 250X and the planned cutting line 900 on the second substrate 220 in plan view and located in the area 102a are removed (sixth process). Since the small-piece portions 1225 overlap with the external circuit connection terminals 102 in the liquid crystal devices 1 which are finally manufactured, the small-piece portions are removed in advance by the present process.

Figure 13C:
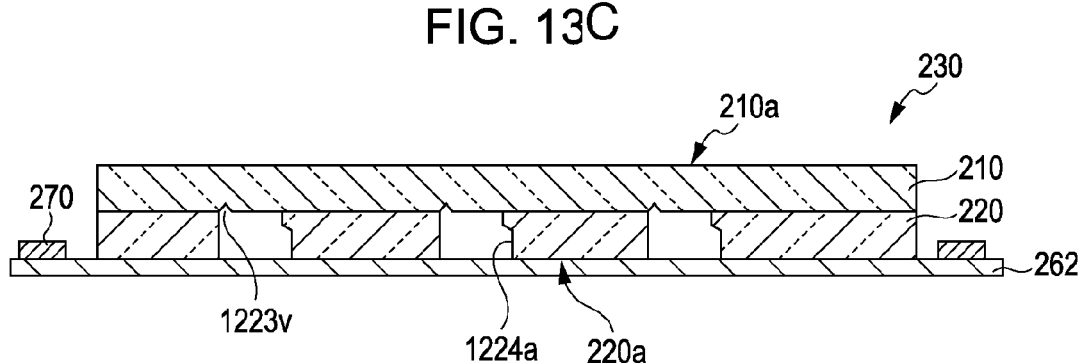

Next, as shown in FIG. 13C, after the first tape 261 is removed from the adhesion surface 210a, the second tape 262 is adhered to the notched surface 220a (seventh process). Accordingly, the composite substrate 230 is fixed to the second tape 262 at the side of the notched surface 220a. In addition, the second tape 262 is adhered to the whole notched surface 220a and, more particularly, to the whole notched surface 220a after the above-described small-piece portions 1225 are removed, similar to the first tape 261.

Figure 14A:
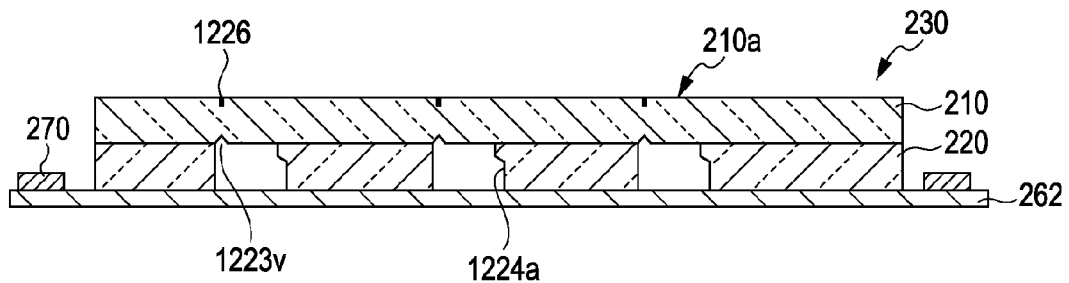
FIGS. 14A-14C are (third) cross-sectional views sequentially showing main processes of the method of manufacturing the electro-optical device according to the second embodiment of the invention.
Figure 15:
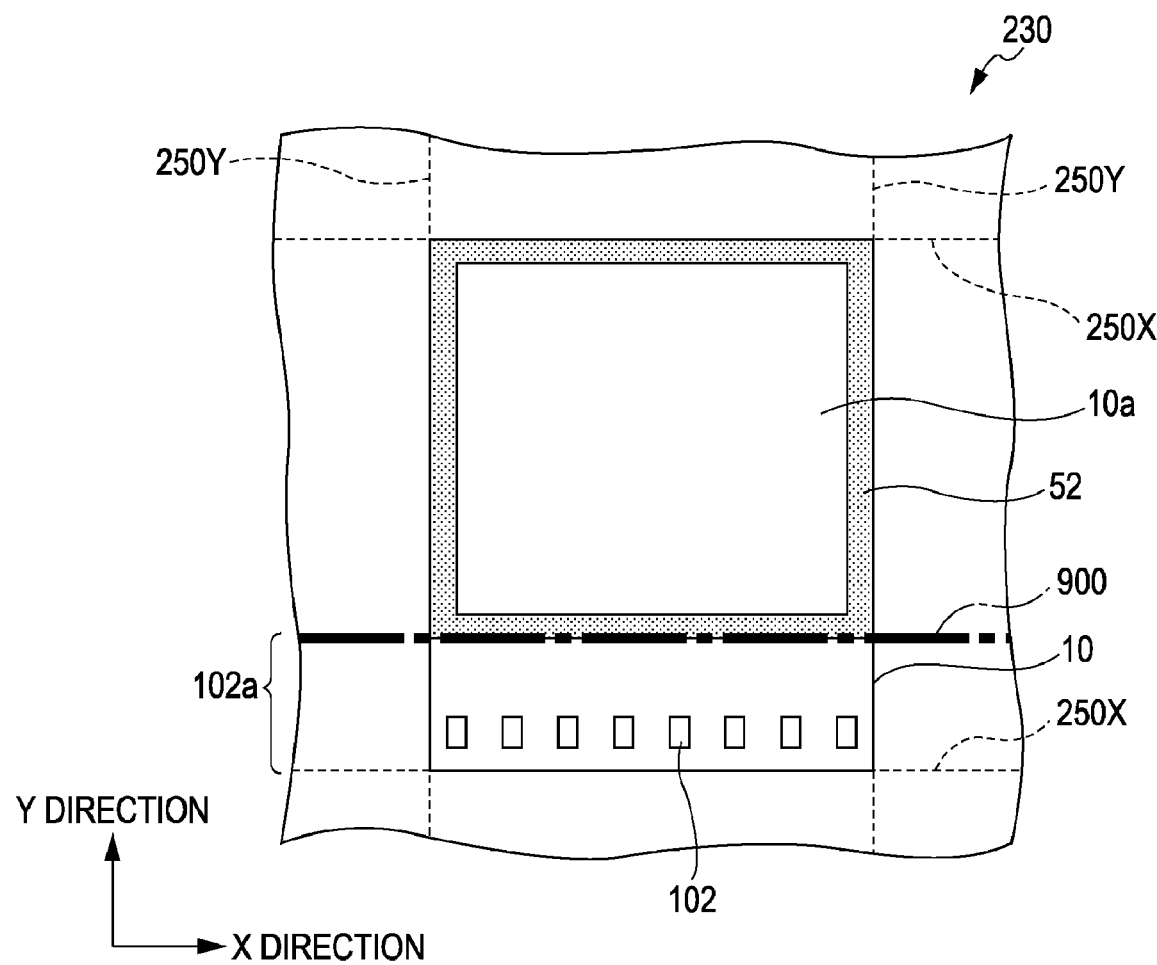
FIG. 15 is an enlarged plan view of a portion of a composite substrate used in the method of manufacturing an electro-optical device according to the second embodiment of the invention.

Next, as shown in FIGS. 14A and 15, the scribing process performed with respect to the adhesion surface 210a of the first substrate 210 along the first outer shape lines 250X so as to form scribing grooves 1226, and the scribing process is performed along the second outer shape lines 250Y so as to form the scribing grooves (not shown) (eighth process). Accordingly, the first substrate 210 is ready to be divided into the portions corresponding to the liquid crystal devices 1 along the first outer shape lines 250X and the second outer shape lines 250Y.

Figure 14B:
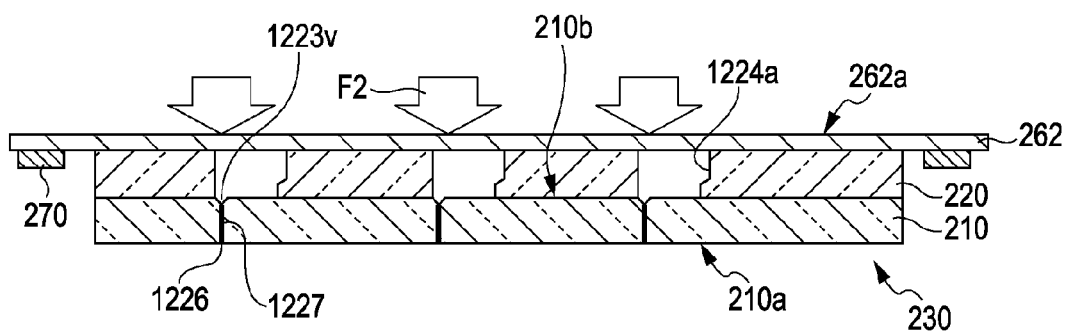

Next, as shown in FIGS. 14B and 15, the first substrate 210 is pressurized from the rear surface 262a, which does not face the second substrate 220, of both surfaces of the second tape 262 via the second tape 262 and the second substrate 220 (force F2 is applied to the first substrate 210) so as to form cut surfaces 1227 starting from the scribing grooves 1226 and extending to the notched portions 1223v, and the breaking process is performed with respect to the first substrate 210 along the first outer shape lines 250X (ninth process). In addition, the rear surface 262a is an example of the "outer surface of the second tape" in the method of manufacturing the second electro-optical device according to the invention. In the ninth process, when the breaking process is performed with respect to the first substrate 210 along the first outer shape lines 250X, as described above, since the notched portions 1223V are formed in the first surface 210b of the first substrate 210 along the first outer shape lines 250X by the fourth process, it is possible to improve the surface accuracy of the cut surfaces 1227 when the breaking process is performed with respect to the first substrate 210 along the first outer shape lines 250X.

Next, by pressuring the first substrate 210 from the rear surface 262a of the second tape 262 via the second tape 262 and the second substrate 220, the breaking process is performed with respect to the first substrate 210 along the second outer shape lines 250Y, starting from the scribing grooves formed along the second outer lines 250Y by the eighth process (tenth process). In addition, any one of the ninth process and the tenth process may be first performed.

Figure 14C:
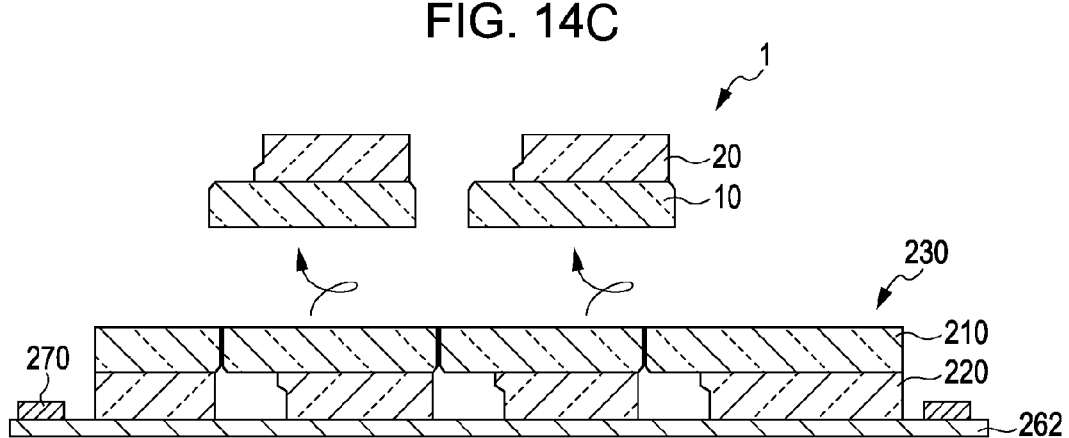

Next, as shown in FIG. 14C, the plurality of liquid crystal devices 1 which are divided from each other by the series of processes from the first process to the tenth process are divided from the second tape 262 (eleventh process). When the plurality of liquid crystal devices 1 are removed from the second tape 262, that is, are separated from the second tape 262, the plurality of liquid crystal devices 1 are sucked by a suction unit such as a sorter device.

As described above, according to the method of manufacturing the electro-optical device of the present embodiment, it is possible to manufacture the liquid crystal devices 1 with high external accuracy. Accordingly, it is possible to improve yield.

What is claimed is:

1. A method of manufacturing a plurality of electro-optical devices by cutting a composite substrate obtained by adhering a first substrate and a second substrate which faces the first substrate with an electro-optical layer interposed therebetween, the method comprising:

forming first notched portions in a notch surface of the second substrate along first outer shape lines that extend parallel to each other, the notch surface facing away from the electro-optical layer;

adhering a first tape to an adhesion surface of the first substrate, the adhesion surface facing away from the electro-optical layer;

applying force to the first notched portions from a surface of the first tape opposed to the adhesion surface so as to form first division surfaces in the second substrate, the first division surfaces starting from the first notched portions and extending to a first surface of the second substrate, the first surface facing the electro-optical layer;

performing a first dicing process on the second substrate along positions parallel to the first outer shape lines and different from the first division surfaces so as to form first division grooves in the notched surface, the first division grooves extending from the notched surface of the second substrate to the first surface of the second substrate, performing a second dicing on the second substrate from the notched surface along second outer shape lines that intersect the first outer shape lines, so as to form second division grooves extending along the second outer shape lines;

removing portions surrounded by the first division surfaces, the first division grooves, and the first surface of the second substrate;

adhering a second tape to the notched surface after the first tape is removed from the adhesion surface of the first substrate;

forming second and third notched portions in the adhesion surface of the first substrate following parallel to the first and second outer shape lines;

applying force to the second notched portions from a surface of the second tape, which is opposed to an adhesion surface of the second tape, so as to form second division surfaces starting from the second notched portions in the first substrate and extending to a second surface of the first substrate, the second surface facing the electro-optical layer and to form third division surfaces starting from the third notched portions and extending following the second outer shape lines; and dividing the plurality of electro-optical devices, which are divided from each other by the applying of the force to the second notched portions, from the second tape.

2. The method according to claim 1, wherein, after the forming of the first notched portions, the composite substrate is cleaned using gas.

3. The method according to claim 1, wherein, after the performing of the dicing process, the composite substrate is dried.

4. The method according to claim 1, wherein, after the applying of the force to the second notched portions, the composite substrate is cleaned using gas.

5. The method according to claim 1, wherein during the first dicing process, the second substrate is cut along the first outer shape lines by penetrating through the second substrate.

* * * * *